Sept. 8, 1936.  K. PETSCHENIG  2,053,737
CALCULATING APPARATUS
Filed March 22, 1934
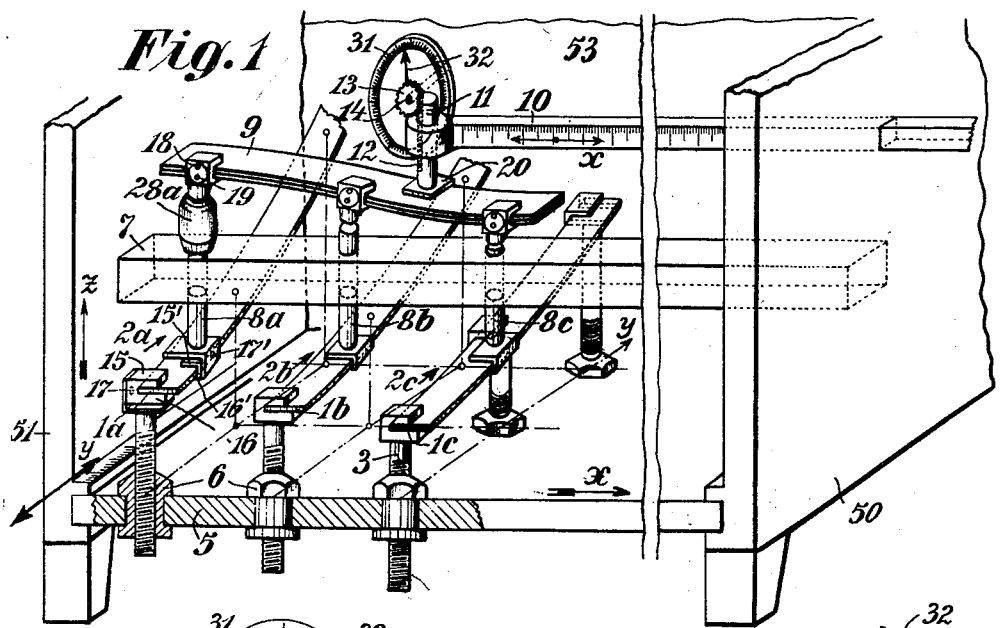
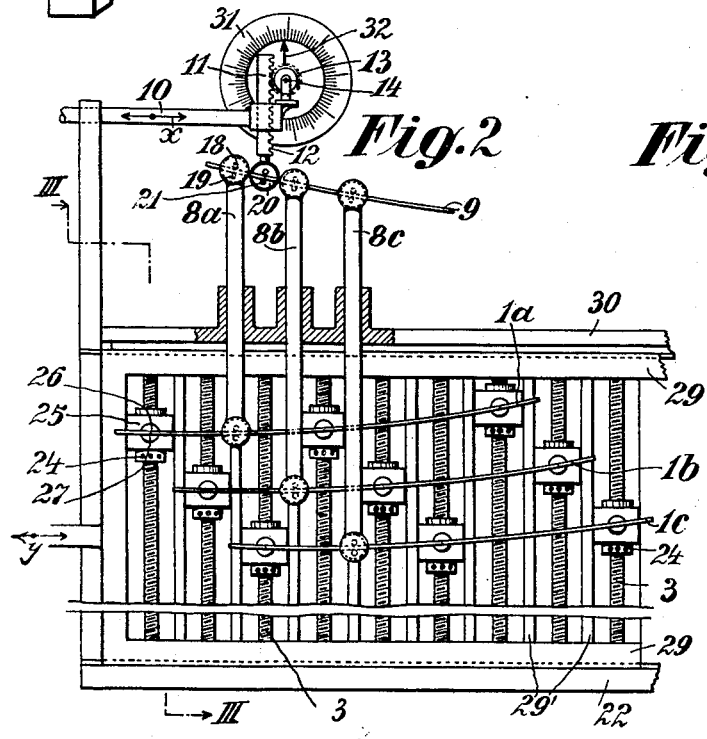
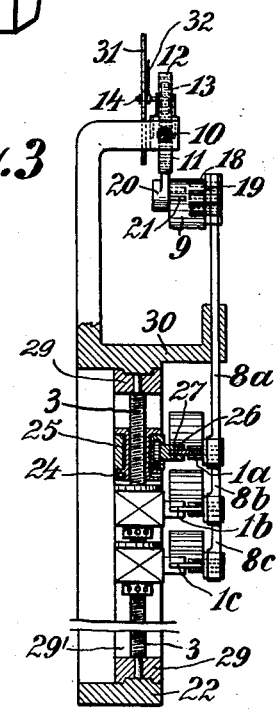
Inventor:—
Karl Petschenig
by E. L. _____
Atty.

Patented Sept. 8, 1936

2,053,737

UNITED STATES PATENT OFFICE 2,053,737

CALCULATING APPARATUS

Karl Petschenig, Vienna, Austria, assignor to Actiengesellschaft C. P. Goerz Optische Anstalt Actiova Spolecnost K. P. Goerz opticky ustav, Bratislava, Czechoslovakia, a company of Czechoslovakia Application March 22, 1934, Serial No. 716,918
In Czechoslovakia March 27, 1933

6 Claims. (Cl. 235—61)

The invention relates to a method of and an apparatus for mechanically determining the value of a dependent variable corresponding to given values of two independent variables. For facilitating the understanding of the essence of this invention reference is had to the drawing in which Fig. 1 is a perspective view of one embodiment of the invention, Fig. 2 is a front elevation partly in section of a modification and Fig. 3 is a section on the line III, III, Fig. 2.

Considering the problem to be approached in general mathematical terms, it is evident that when a quantity is dependent upon two other quantities, then these two last-mentioned quantities are the independent variables, while the first quantity is the dependent or subordinate variable. The relation existing between the three quantities is conventionally represented mathematically by the equation $z=f(x, y)$ wherein $z$ represents the dependent variable, which is the $z$ ordinate in a space- coordinate system, while $x, y$ are the independent variables. $f$ indicates a known function of the two independent variables $x, y$. Now, it is well known that the equation given above $z=f(x, y)$ is that of a curved surface, and for facilitating the graphical representation of this surface and the formation of a clear idea of its configuration, it is customary in mathematics to select various specific values for either one of the independent variables. Let us treat of the variable $x$; then various specific values $x_1, x_2, x_3 \ldots$ are selected. With these values at hand, the equation $z_1=f(x_1, y)$, $z_2=f(x_2, y)$, $z_3=f(x_3, y)$ are solved for values of $z$ and $y$, these equations being those curves of the loci of intersection of the surface represented by the equation $z=f(x, y)$ with planes which are parallel to the $yz$-plane of the coordinate system, and hence perpendicular to the $xy$, and located at specific distances, $x_1, x_2, x_3$, etc. from the origin of the coordinate system. Each of these specific equations as listed above gives the relation between the variables $z_1, z_2$ and $z_3$ with the variable $y$ for the selected value $x_1, x_2$ and $x_3$ respectively of the variable $x$. If now, in any of the specific equations, say in $z_1=f(x_1, y)$ a certain specific value $y_1$ is selected for the variable $y$ when the equations $z'_1=f(x_1, y_1)$ gives the value $z'_1$ of the ordinate $z$ for selected values $x_1$ and $y_1$ and the variable $x$ and $y$.

Applying the foregoing general discussion to a specific instance, let us say that the angle of elevation of an ordinance piece is the dependent variable, while the independent variables are firing distances and the angle sighting line respectively. Thus, in the equation $z=f(x, y)$ $z$ is the dependent variable or angle of elevation, while $x$ and $y$, the independent variables represent respectively the firing distance and the angle of the sighting line. In this example $f$ indicates a known function of $x, y$, which may be readily determined by means of shooting or practice tables. To obtain a graphical representation of this equation $z=f(x, y)$, we may select exact values of the firing distance $x$, insert these in the equation, and solve for the relation of the dependent variables to the other independent variables. Thus, we would obtain the relation between the angle of elevation, and the angle of the sighting line for given specific distances. Now, in any specific equation, let us say in $z_1=f(x_1, y)$ that a certain value $y_1$ is selected for the angle of the sighting line. Then, if this value be inserted in the equation, we obtain from the revised equation $z'_1=f(x_1, y_1)$ a value $z'_1$ for the angle of elevation, for the given selected values of the firing distance and angle of sighting line, respectively.

In Fig. 1 of the drawing a base plate 5 of a stationary frame is assumed to be parallel to the $x, y$-plane of the system of coordinates used, and side plates 51, 50 of said frame perpendicular to said base plate 5 are assumed to be parallel to the $y, z$-plane of the system of coordinates. A back plate 53 of said frame is perpendicular to both the base plate 5 and the side frame, and is also perpendicular to the side plates 51 and 50 and hence parallel to the $x, z$ plane of the system of coordinates. In the base plate, nuts 6 are rotatably mounted but locked against longitudinal movement. These nuts are arranged in lines parallel to the $y$-axis of the system of coordinates and their centers have in common the same value of $x$. Through these nuts pass posts constructed as shown as screw spindles 3, perpendicular to the base plate and hence parallel to the $z$-axis of the system of coordinates. By properly turning the nuts of the screw spindles 3 of each set which is arranged parallel to the $y$-axis, the top ends of the screw spindles 3 may be adjusted so that they are in lines of intersection of the plane parallel to the $y, z$-plane of the system of coordinates and corresponding to the set of posts with the surface represented by the equation $z=f(x, y)$, so that the top ends of the adjusted spindles 3 passing through the nuts 6 located in a line parallel to the $y$-axis for which $x$ has the value $x_1$, are in a curve represented by the equation $z_1=f(x_1, y)$. Now, for mechanically representing the various lines of intersection, the top ends of the posts or screw spindles 3 carry jaws 15, 16 into which elastic but comparatively stiff bands 1a, 1b, 1c etc., constructed for instance of steel are placed, so that they project by about one half of their width from said jaws. It will be understood that thus the bands 1a, 1b, 1c mechanically represent the successive lines of intersection of the planes of the various sets of posts or screw spindles, and that they fulfill their purpose more exactly in inverse ratio to the distance between adjacent posts or screw spindles in each set parallel to the $y$, $z$-plane.

The side plates 51, 50, are fixed and carry guides 54, parallel to the $y$-axis of the system of coordinates. On these guides a carrier 7 is so mounted that the base plate 5 with the posts 3 and the bands 1a, 1b, 1c etc. are movable relatively to said carrier and hence to the side plates in the direction of the $y$-axis of the system of coordinates. In this carrier are slidably mounted interponents 8a, 8b, 8c, parallel to the $z$-axis of the system of coordinates, one for each of the sets of posts 3. Each of the interponents is provided at its bottom end with jaws 15' and 16' engaging the edges of the bands 1a, 1b, 1c etc. projecting from the jaws 15, 16. The top ends of the interponents 8a, 8b, 8c, carry jaws 18, 19 into which engages an elastic comparatively stiff band 9, for instance of steel. The interponents 8a, 8b, 8c, may be of the same length $a$ throughout or they may be adjustable longitudinally, by any suitable means as diagrammatically indicated at 28a for the interponent 8a, for a purpose to be explained later on. Assuming that the interponents 8a, 8b, 8c, are of the same length $a$ throughout, then it will be readily understood that when the carrier 7 and the base plate 5 together with the bands 1a, 1b, 1c, etc. are so adjusted relatively to each other that the $y$-ordinate of the interponents has the value $y_1$ relatively to the origin of coordinates assumed to be fixed in the base plate, then the band 9 mechanically represents the line of intersection of the surface corresponding to the equation $z+a=f(x, y)$ with a plane parallel to the $x$, $z$-plane of the system of coordinates and located at a distance $y_1$ from the origin of coordinates, or in other words the band 9 mechanically represents the curve $z_1+a=f(x, y_1)$.

The carrier 7 is fastened onto the vertical plates 50 and 51. The base plate 5 is slidable in the said vertical plates 50 and 51. The horizontal arm 10 is guided in the vertical plate 50 and can be moved horizontally in the direction of the $x$-axis. A vertical arm 11 is guided in the horizontal arm 10 and is movable in a vertical direction, i. e. in the direction of the $z$-axis. The movement of the base plate 5 and of the arm 10 may take place simultaneously but it is also possible that the base plate 5 is adjusted first and then the arm 10, or vice-versa. This arm 11 carries at its bottom end jaws 20, 21 engaging the free edge of the elastic band 9 and is provided with means indicating the extent of its movement parallel to the $z$-axis. For example, it may be provided with a rack 12 engaging with a pinion 13 having a journal pin 14 revolubly mounted in a guide 10 slidable in the vertical plate 50, and in which guide the arm 11 slides, the said pinion 13 carrying a pointer 32 moving along a scale 31, said guide being parallel to the $x$-axis. Since the guide 10 is movable along the $x$-axis and the arm 11 is slidable in a vertical direction, i. e. parallel to the $z$-axis, the said arm 11 can be adjusted in both the $x$-axis and the $z$-axis. If now the arm 11 and the guide 10 are adjusted to a value $x_1$ while the jaw 20 slides along the free edge of the band 9 then the jaw 20 will occupy a position defined by the equation $z_1+a_1=f(x_1, y_1)$ as will be readily understood, and if the scale 31 has a properly selected division whereby the constant $a_1$ is eliminated, then the pointer 32 will directly indicate the value $z_1$ on the scale 31.

The journal pin 14 may, if desired, be connected to a flexible shaft for transmitting its rotary movement to any more or less remote point. Assuming that the carrier 7 is stationary and the base plate 5 together with the bands 1a, 1b, 1c and so on is movable parallel to the $y$-axis the operation of the apparatus is as follows:

If it is desired to determine from the equation $z=f(x, y)$ the value $z_2$ of $z$ corresponding to any given values $x_2$, $y_2$ of $x$ and $y$ respectively by means of the apparatus hereinbefore described, then after adjusting the bands 1a, 1b, 1c and so on as above described and the interponents 8a, 8b, 8c and so on, it is only necessary to adjust the plate 5 together with the bands 1a, 1b, 1c and so on to the given value $y_2$ and the measuring device 11 to the given value $x_2$ whereupon this measuring device will directly give the value $z_2$ sought of $z$ or transmits this value to any desired point.

Or the plate 5 may be made stationary and the carrier 7 and the band 9 together with the guide 10 and the arm 11 may be made movable parallel to the $y$ axis of the system of coordinates.

In order to secure a proper adjustment of the bands 1a, 1b, 1c, and so on they are so inserted between jaws 15, 16 at the top ends of the posts 3, that a longitudinal part of their length projects beyond these jaws; on this part slide similar jaws 15', 16' at the bottom ends of the interponents without interfering with the jaws 15, 16. Preferably the jaws 15, 16 and 15', 16' of the posts 3 and the interponents 8a, 8b, 8c, and so on respectively are pivoted on pins 17, 17' respectively parallel to the $x$ axis of the system of coordinates in order that these jaws may properly accommodate themselves to the curvature of the bands 1a, 1b, 1c and so on. Instead of such jaws pairs of pins 18, 19 are provided on the top ends of the interponents 8a, 8b, 8c and so on. On the measuring device 11 a similar pair of pins 20, 21 is provided. One edge of the band 9 is engaged by the pairs of pins 18, 19 and the other by the pair of pins 20, 21, the latter being adapted to pass freely past the pairs of pins 18, 19 whenever the arm 10 is moved parallel to the $x$ axis of the system of coordinates. The pairs of pins 18, 19 and 20, 21 at the top ends of the interponents 8a, 8b, 8c and so on and at the measuring device 11 respectively are preferably rotatable around journal pins parallel to the $y$ axis of the system of coordinates.

Owing to the fact that the posts 3 are adjustable parallel to the $z$ axis of the system of coordinates the apparatus hereinbefore described may be used for any function $f(x, y)$. Furthermore the interponents 8a, 8b, 8c and so on may be made adjustable parallel to the $z$ axis of the system of coordinates for instance by making each of them in two parts 8a, 28a, (Fig. 1) screwed into each other, as indicated at 28a on Fig. 1. The part 28a acts like a turn-buckle, so that if the nut of the part 28a is turned in one direction, the length of the interponent 8a is increased, whereas if the said nut is turned in the opposite direction the length of the said interponent is decreased. The adjustability of the posts 3 and the interponents enables any desired corrections of the curves represented by the bands $1a$, $1b$, $1c$ and so on and by the band 9 which corrections might be necessitated by changes in parameters of the equation $z=f(x, y)$.

The apparatus above described is rather bulky. This drawback may be removed by projecting in Fig. 1 the band 9 and the bands $1a$, $1b$, $1c$ and so on into the $y$, $z$ plane of the system of coordinates by projecting lines parallel to the $x$, $y$ plane and inclined to the $y$, $z$ plane at an angle of 45°. As a consequence the arrangement of Fig. 2 is obtained, in which the bands $1a$, $1b$, $1c$, etc., as well as the band 9, are in substantially one plane. It is to be noted that the points of the bands, where they intersect the $x$, $z$ plane, are staggered with respect to each other, when the said points are projected angularly into the showing of Fig. 2. However, these bands have the same meaning and character as the interponents $8a$, $8b$, $8c$, etc., and the posts 3. The former are carried by a stationary frame 30, and the latter by a frame 29, slidable in the direction of the $y$-axis in the frame 30, and in a frame 22 integral with the frame 30. The stationary frame 30 carries the arm 10 and the measuring device in the $y$-direction.

In this constructional form of the apparatus also it is only necessary to adjust the posts 3 in accordance with the equation $z=f(x, y)$ and the various successive values of $x$ whereby the bands $1a$, $1b$, $1c$ and so on obtain their proper shape. Then starting from the proper points of the bands $1a$, $1b$, $1c$ and so on thus adjusted the interponents $8a$, $8b$, $8c$ and so on are adjusted in accordance with the given value $y_2$ of $y$ by shifting the frame 29 in the frames 22 and 30 and the band 9 is placed on the interponents $8a$, $8b$, $8c$ and so on. Finally the arm 10 carrying the measuring device 11, is shifted relatively to the stationary frames 22 and 30 in a direction perpendicular to the posts 3 until the measuring device 11 has reached on the band 9 the given value $x_2$ of $x$ whereupon the measuring device indicates the value $z_2$ sought of $z$ which results from the equation $z_2=f(x_2, y_2)$.

All the possibilities of adjustment described with reference to Fig. 1, are to be found also in the constructional form shown in Figs. 2 and 3. It is to be noted that the posts and interponents brought to coincidence by the above mentioned projection may be replaced by a single post or interponent respectively which must permit of independently adjusting a plurality of bands $1a$, $1b$, $1c$ and so on and one point of the band 9 respectively from a plurality of bands $1a$, $1b$, $1c$ and so on. This is accomplished by constructing the posts 3 as also the interponents $8a$, $8b$, $8c$ and so on in alignment therewith as a screw spindle 3 locked against longitudinal movement in the guide 29' of the frame 22 on which is rotatably mounted the requisite number of nuts 24. Each of the nuts carries a ring 25 locked against rotation, but movable axially with the nut and carrying a pair of jaws or pins 26, 27 engaging with the associated band $1a$, $1b$, $1c$ and so on or with the band 9 as the case may be.

The present apparatus is suitable for serving many purposes other than that indicated in the example hereinbefore referred to for instance for readily determining the elevation of an anti-aircraft ordnance from the given angular altitude and distance of the aircraft from the ordnance. In this case the corrections for different muzzle velocities, weight and shapes of the projectiles may be readily made owing to the adjustability of the posts 3 and the interponents. But the invention is suitable for use also in other cases in which from an equation $z=f(x, y)$ the value of $z$ has to be quickly and easily determined for given values of $x$ and $y$.

The merely constructional details of the apparatus above described may be varied without departing from the essence of the invention.

What I claim is:

1. An apparatus for mechanically determining the value of a dependent variable $z$ for given values of independent variables $x$, $y$, from a given equation $z=f(x, y)$, said equation defining a surface in orthogonal coordinates, comprising a set of elastic, comparatively stiff bands, means for supporting and bending each of said bands to simulate the intersection of said surface with a plane which is parallel to the $y$, $z$ plane of said system, means for adjustably supporting on points of the bands of said set another and comparatively stiff band, the last-named points being located and maintained in a plane parallel to the $x$, $z$ plane of said system, means for effecting a relative displacement between said one band and the set of bands in the direction of the $y$-axis according to any given value of the second independent variable, means adjustable to a position along said second band to any given value of the first independent variable, and indicating means connected with and actuated by said last-mentioned means for indicating the value of the dependent variable.

2. An apparatus for mechanically determining the value of a dependent variable $z$ for given values of the independent variables $x$, $y$, from a given equation $z=f(x, y)$, said equation defining a surface in orthogonal coordinates, comprising a set of elastic, comparatively stiff bands, means for supporting and bending each of said bands to simulate the intersection of said surface with a plane which is parallel to the $y$, $z$ plane of said system, said supporting and bending means including posts adjustable in the direction of the axis of said coordinates corresponding to the dependent variable $z$, means for adjustably supporting on points of the bands of said set another and comparatively stiff band, the last-named points being located and maintained in a plane parallel to the $x$, $z$ plane of said system, the said adjustably supporting means including interponents extending in the direction of the $z$-axis, means for effecting a relative displacement between said one band and the set of bands in the direction of the $y$-axis according to any given value of the second independent variable, means adjustable to a position along said second band to any given value of the first independent variable, and indicating means connected with and actuated by said last-mentioned means for indicating the value of the dependent variable.

3. An apparatus for mechanically determining the value of a dependent variable $z$ for given values of the independent variables $x$, $y$, from a given equation $z=f(x, y)$, said equation defining a surface in orthogonal coordinates, comprising a set of elastic, comparatively stiff bands, means for supporting and bending each of said bands to simulate the intersection of said surface with a plane which is parallel to the $y$, $z$ plane of said system, said supporting and bending means including posts adjustable in the direction of the axis of said coordinates corresponding to the dependent variable $z$, means for adjustably supporting on points of the bands of said set another and comparatively stiff band, the last-named points being located and maintained in a plane parallel to the $x$, $z$ plane of said system, the said adjustably supporting means including interponents extending in the direction of the $z$-axis, means including a structure supporting said posts and said set of bands for effecting a relative displacement between said one band and the set of bands in the direction of the $y$-axis according to any given value of the second independent variable, and an arm carrying an indicating device adapted to slide on said one band to a position corresponding to any given value of the first independent variable, said indicating device having a part bearing on the said one band so as to indicate the momentary value of the dependent variable.

4. An apparatus for mechanically determining the value of a dependent variable $z$ for given values of the independent variables $x$, $y$, from a given equation $z=f(x, y)$, said equation defining a surface in orthogonal coordinates, comprising a set of elastic, comparatively stiff bands, means for supporting and bending each of said bands to simulate the intersection of said surface with a plane which is parallel to the $y$, $z$ plane of said system, said supporting and bending means including posts adjustable in the direction of the axis of said coordinates corresponding to the dependent variable $z$, means for adjustably supporting on points of the bands of said set another and comparatively stiff band, the last-named points being located and maintained in a plane parallel to the $x$, $z$ plane of said system, the said adjustably supporting means including interponents extending in the direction of the $z$-axis, means for adjusting each said interponent in the direction of the $z$-axis, means for effecting a relative displacement between said one band and the set of bands in the direction of the $y$-axis, according to any given value of the second independent variable, means adjustable to a position along said second band to any given value of the first independent variable, and indicating means connected with and actuated by said last-mentioned means for indicating the value of the dependent variable.

5. An apparatus for mechanically determining the value of a dependent variable $z$ for given values of the independent variables $x$, $y$, from a given equation $z=f(x, y)$, said equation defining a surface in orthogonal coordinates, comprising a set of elastic, comparatively stiff bands, means for supporting and bending each of said bands to simulate the intersection of said surface with a plane which is parallel to the $y$, $z$ plane of said system, said supporting and bending means including posts adjustable in the direction of the axis of said coordinates corresponding to the dependent variable $z$, means for adjustably supporting on points of the bands of said set another and comparatively stiff band, the last-named points being located and maintained in a plane parallel to the $x$, $z$ plane of said system, the said adjustably supporting means including interponents extending in the direction of the $z$-axis, means for effecting a relative displacement between said one band and the set of bands in the direction of the $y$-axis according to any given value of the second independent variable, means adjustable to a position along said second band to any given value of the first independent variable, and indicating means connected with and actuated by said last-mentioned means for indicating the value of the dependent variable, said set of bands and said one band, together with said posts and interponents, being disposed in substantially a single plane, and the individual bands of said set of bands being staggered relatively to each other.

6. An apparatus for mechanically determining the value of a dependent variable $z$ for given values of the independent variables $x$, $y$, from a given equation $z=f(x, y)$, said equation defining a surface in orthogonal coordinates, comprising a set of elastic, comparatively stiff bands, means for supporting and bending each of said bands to simulate the intersection of said surface with a plane which is parallel to the $y$, $z$ plane of said system, said supporting and bending means including posts adjustable in the direction of the axis of said coordinates corresponding to the dependent variable $z$, means for adjustably supporting on points of the bands of said set another and comparatively stiff band, the last-named points being located and maintained in a plane parallel to the $x$, $z$ plane of said system, the said adjustably supporting means including interponents extending in the direction of the $z$-axis, means for effecting a relative displacement between said one band and the set of bands in the direction of the $y$-axis according to any given value of the second independent variable, means adjustable to a position along said second band to any given value of the first independent variable, and indicating means connected with and actuated by said last-mentioned means for indicating the value of the dependent variable, said set of bands and said one band, together with said posts and interponents, being disposed in substantially a single plane, and the individual bands of said set of bands being staggered relatively to each other, said posts and interponents being provided with pairs of jaws rotatably mounted therein and embracing and adapted to slide along the associated bands, the axes of rotation of said pairs of jaws being perpendicular to the edges of said bands and in the tangent planes thereof.

KARL PETSCHENIG.